United States Patent Office 3,488,482
Patented Jan. 6, 1970

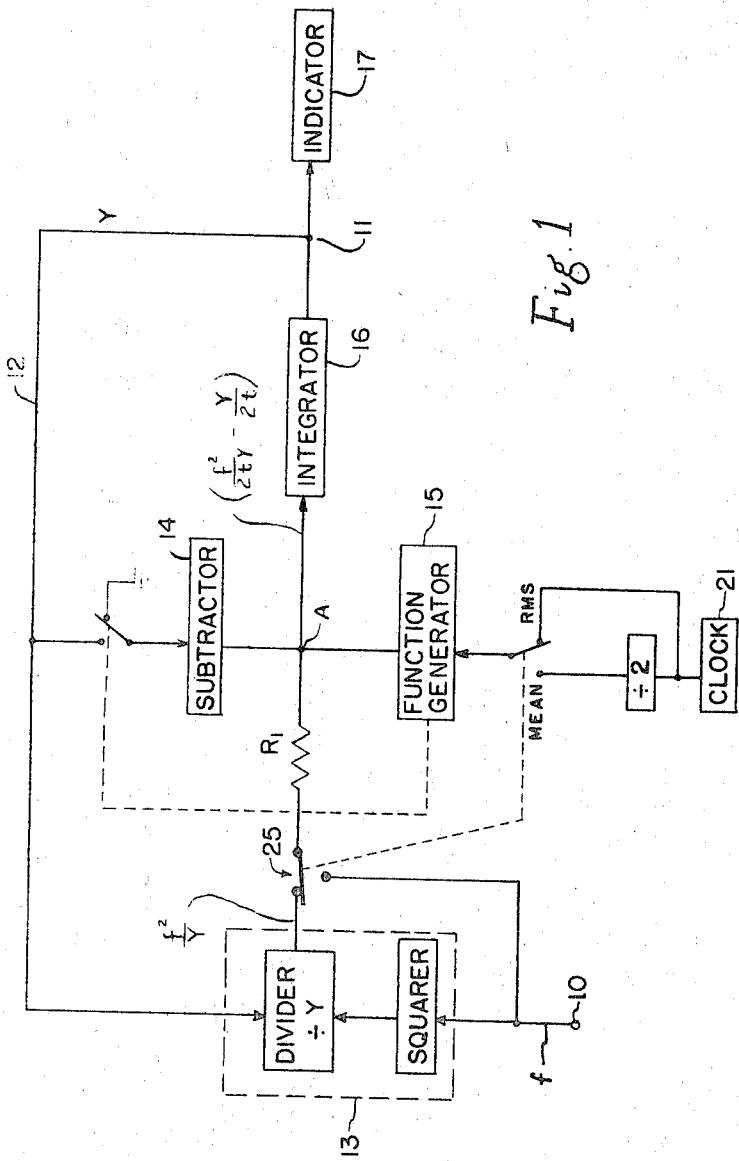

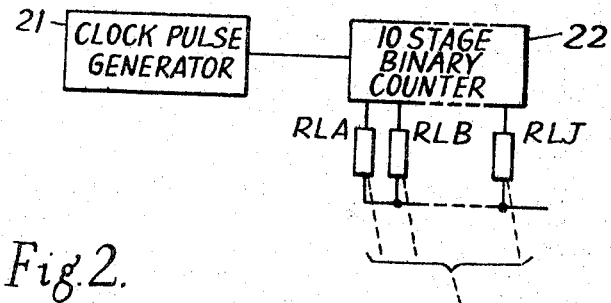
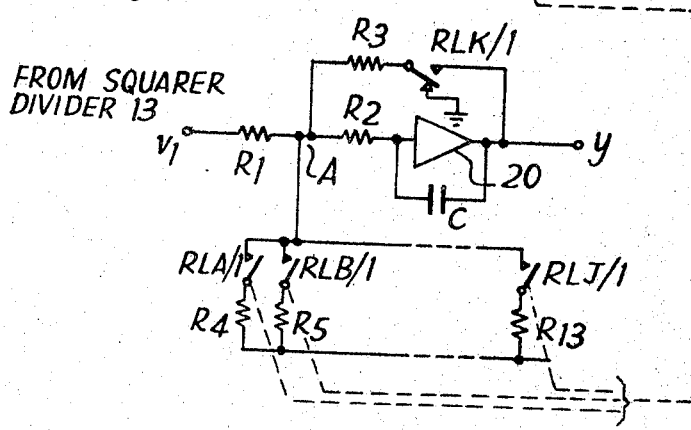
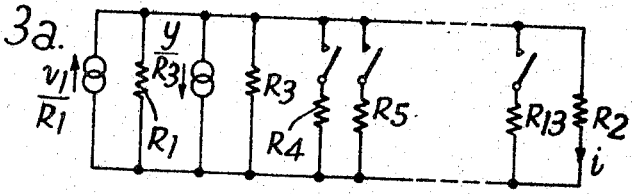
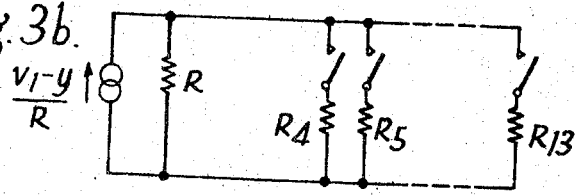

3,488,482
APPARATUS FOR COMPUTING THE RMS OR MEAN VALUE OF A FUNCTION
Anthony John Ley, Camberley, England, assignor to The Solartron Electronic Group Limited, Farnborough, England, a British company
Filed Apr. 12, 1965, Ser. No. 447,154
Claims priority, application Great Britain, Apr. 21, 1964, 16,517/64
Int. Cl. G06g 7/18, 7/62; G06f 15/20
U.S. Cl. 235—183                 11 Claims

ABSTRACT OF THE DISCLOSURE

A method and apparatus for computing the RMS or mean value of a function wherein an input signal is squared and divided by the output signal. The output and quotient signals are subtracted and the difference is divided by a time function. The result is integrated to provide an RMS value which stabilizes in a short time period.

---

The present invention relates to meters for measuring the root means square (R.M.S.) value and/or the mean value of a voltage or current.

One of the best known meters for measuring R.M.S. values utilises the thermal effect of a current, which varies with the average square of the current. The thermal effect is used for example, to heat a thermo-couple or a temperature dependent resistor. The signal developed may be made linear using a function generator.

Such meters are liable to errors due to variations of ambient temperature. Also since the average square depends on the thermal mass of a component fixed in the meter, a single meter cannot accurately measure a low frequency input and also rapidly measure a high frequency input. It has not been possible to measure the R.M.S. value of a stationary random process without prior knowledge of, and limitations on, its spectral distribution.

According to the present invention, in one aspect, there is provided a meter for measuring the R.M.S. value of an eletcrical voltage or current, comprising means for squaring the instantaneous input to the meter, means for dividing the square value signal by the output signal of the meter to form a quotient signal, means for forming a difference signal from the quotient signal and the said output signal, means for dividing the difference signal by a factor which increases linearly with respect to time, and an integrator adapted to integrate with respect to time the signal thus provided to yield the said output signal.

There is also provided a method of testing, namely a method of measuring the R.M.S. value of an eletcrical voltage or current signal, wherein the input signal is squared and divided by the resulting output signal so obtained, thus forming a quotient signal. The difference between the quotient signal and the said output signal is then formed and divided by a signal which increases linearly with respect to time to form a further signal which is integrated with respect to time to yield the said output signal.

According to another aspect of the present invention there is provided a meter for measuring the mean value of an electrical voltage or current comprising means for forming a difference signal from the instantaneous input to the meter and the output signal of the meter, means for dividing the difference signal by a signal which increases linearly with respect to time, and an integrator adapted to integate, with respect to time, the signal thus provided to yield the said output signal.

Another method of testing is also provided, namely a method of measuring the R.M.S. value of an electrical voltage or current signal wherein a difference signal is formed from the signal to be measured and the resultant output signal of the method, the difference signal is divided by a factor which increases linearly with respect to time to form a further signal which is integrated with respect to time to yield the said output signal.

In either meter the means which divide the difference signal by a signal which increases linearly with respect to time are clearly liable to give spurious results for small values of time. For this reason division may be by a fixed parameter up to a suitable $t_1$. As will subsequently be shown this fixed parameter should be the value which would in any case have been reached at $t_1$ and the output of the meter is not subtracted from the quotient signal in the interval O to $t_1$.

Also practical difficulties arise in dividing by a very large number and a later time $t_2$ may be fixed, after which the parameter stays at the value it had reached at $t_2$. The output of the meter will then continue to approach the limit R.M.S. value but exponentially with a time constant determined by $t_2$.

Clearly the R.M.S. value meter and the mean value meter may be incorporated in a single instrument with a switch 25 which selects the appropriate connections for each use. Since, as will be described later, the magnitude of the linearly increasing signal for the two meters is different, the appropriate scale factor or magnitude of linearly-increasing signal must also be selected. In the position shown in FIG. 1, the output of the squarer-divider circuit is chosen for subsequent processing, this signal being the square of the input divided by the output, and the apparatus operates as an R.M.S. meter. When switch 25 is in the other position, the unsquared input signal is chosen and the apparatus operates as a mean value meter. The other contact set of switch 25 selects a division factor of 1 or 2, corresponding to R.M.S. or mean value functions, respectively, as will appear from the following equations.

Before describing an embodiment of the invention the mathematical basis of the invention will be outlined.

The R.M.S. value of a function is not an algebraic function of the corresponding instantaneous value, but is the limit of a stationary process.

The R.M.S. value is defined as:
Limit of $$\sqrt{\frac{1}{2t}\int_{-t}^{t} f^2(\tau)d\tau}$$

where $f(\tau)$ is the function whose R.M.S. value is to be determined, $\tau$ being the independent time variable and $\pm t$ are the limits of integration.

In a finite time, $t_f$, the best estimate of the R.M.S. value $y(t)$, is $$y = \sqrt{\frac{1}{t_f}\int_0^{t_f} f^2(\tau)d\tau}$$

(Equation 1)

The confidence level of this estimate increases with increase in time $t_f$.

Equation 1 can be re-written (for any time $t$):

$$\int_0^t f^2(\tau)d\tau = ty^2$$

i.e.

$$\int_0^t f^2(\tau)\,d\tau = \int_0^t 2\tau y \frac{dy}{d\tau}d\tau + \int_0^t y^2 d\tau$$

i.e.

$$\int_0^t \frac{f^2(\tau)}{2\tau y} d\tau = \int_0^t \frac{dy}{d\tau} d\tau + \int_0^t \frac{y}{2\tau} d\tau$$

i.e. rearranging $$\int_0^t \frac{dy}{d\tau} d\tau = y(t) - y(o) = \int_0^t \frac{f^2}{2\tau y} d\tau - \int_0^t \frac{y}{2\tau} d\tau$$

(Equation 2)

It is this equation which is the basis of the R.M.S. meter.

The mean value $y$ (mean) of the instantaneous value of the function is given by:

$$y \text{ mean} = \underset{t \to \infty}{\text{Limit}} \frac{1}{2t} \int_{-t}^{t} f(\tau) d\tau$$

where $t=$time, and $f(\tau)$ is the function whose mean value is to be found.

The best available estimate $w(t)$ of $y$ mean in finite time $t$ is $$w(t) = \frac{1}{t} \int_0^t f(\tau) d\tau$$

This may be rearranged in the form $$w(t) = w(o) + \int_0^t \frac{f(\tau) - w(\tau)}{\tau} d\tau \quad \text{(Equation 3)}$$

This equation is the basis of the mean value meter.

Certain embodiments of the invention will now be described by way of example with reference to the accompanying drawings in which:

FIG. 1 is a block diagram of an R.M.S. meter according to the invention.

FIG. 2 is a part circuit diagram part block diagram showing in more detail part of FIG. 1, FIG. 3a is a equivalent circuit diagram of part of FIG. 2, and FIG. 3b shows FIG. 3a simplified.

Referring to FIG. 1, the signal to be measured is applied at terminal 10 to a squarer–divider circuit 13 (mentioned in more detail later) which also has an input from the output terminal 11 of the meter through feedback path 12. The squarer-divider circuit therefore forms $f^2/y$ which appears in Equation 2. Feedback path 12 also provides the output $y$ of the meter to a subtractor circuit 14 which is connected, with the output of squarer-divider circuit 13 through a resistor $R_1$ to a junction point A to form the function $$\frac{f^2}{y} - y$$

A function generator 15 is also connected to point A to continuously divided the subtracted output by a function which increases linearly with time and is therefore proportional to $2t$. The output of the function generator proportional to $$\frac{f^2}{2ty} - \frac{y}{2t}$$

is passed to an integrator 16 which forms $$\int_0^t \frac{f^2(\tau)}{2\tau y} d\tau - \int_0^t \frac{y}{2\tau} d\tau$$

that is the required R.M.S. value. An indication unit 17 which is connected to the output of the function generator, displays the R.M.S. value obtained.

The actual output of the meter will in general be proportional to $y(t)$, the constant of proportionality being determined by parameters throughout the meter, particularly by the ratio between the said linear function and twice real time, i.e. the relationship between meter time and real time. As shown in FIG. 1, the time base for the function generator is provided by a clock 21 the output of which is used directly by the function generator in R.M.S. measurement and is connected thereto through the "MEAN-R.M.S." switch mechanically coupled to switch 25. In mean value measurement the clock output is divided by 2 in a frequency divider 26 before being provided to the function generator.

Isolating amplifiers and potential dividers can be arranged to operate on the output to relate the metr output to the input signal and to real time.

The squarer-divider circuit 13 consists of a mark-space height multiplier which performs the squaring and whose output is fed to another such multiplier and a high gain amplifier carrying out the division process.

The multiplier has a first input, namely the multiplier, which linearly modulates the duty cycle of a 90 kc./s. square wave and a second input, namely the multiplicand, which linearly modulates the amplitude of the square wave. The output, after smoothing, is therefore proportional to the multiplicand and is a linear function of the multiplier. By subtracting a signal from the smoothed output which signal is proportional to multiplicand and of such magnitude that the output of the whole multiplier is zero when the multiplier is zero the multiplier output is proportional to the product of the multiplier and the multiplicand, and if these are equal a square is formed. Such multipliers are commercially available.

The divisor $y$ of the division process carried out by the squarer is fed to another multiplier together with the output $x$ of a high gain amplifier. The product $xy$ is fed to the input of the amplifier in opposition to the square $f^2$ already formed. The output $x$ of the amplifier is thus $-A(f^2-xy)$, where $-A$ is the gain of the amplifier. This gives $$x = \frac{f^2}{y - 1/A}$$

If A is large the $1/A$ term may be neglected, so that amplifier output is nearly equal to the required quotient $f^2/y$.

The function generator one form of which is described in more detail later may be a conventional set of binary-weighted toggles arranged in the form of a clock pulse counter, the state of the circuits in the counter changing as time passes, and so controlling the apparatus carrying out the division, that the divisor in the division increases with time. For example a chain of resistors connected by switches may be used to divide the voltage from the subtractor circuit 14, the counter controlling the switches to increase the total conductance with time.

For a short time, after the signal to be measured has been applied to the meter, the theoretical output of the function generator is infinite. In practice the function generator becomes saturated. To avoid this the function generator is arranged to divide by a constant until a time $t_1$ is reached. During this time the subtractor 14 does not subtract the output from the output of the squarer divider. At time $t_1$ the correct R.M.S. value for that time will have been formed (as is shown below) and after $t_1$ the meter operates normally.

The function generator can clearly be designed to give a fixed divisor $2t_1$ up to time $t_1$ and the clock pulse counter included in the generator can also control a switch 18 in the feed-back connection to the subtractor 14, opening the switch initially and not closing it until time $t_1$ is reached.

Equation 2 can be re-written:

$$y = y(t_1) + \int_{t_1}^{t} \frac{f^2(\tau)}{2\tau y(\tau)} - \frac{y(\tau)}{2\tau} d\tau$$

where $$y(t_1) = \sqrt{\frac{1}{t_1} \int_0^{t_1} f^2(\tau) d\tau}$$

Consider a function $z(t)$ defined such that $$z(t) = \sqrt{\frac{1}{t_1} \int_0^t f^2(\tau) d\tau} \quad \text{(Equation 4)}$$

then clearly $z(t_1) = y(t_1)$

By a process similar to that for deriving Equation 2 but with $t_1$ a constant, Equation 2 may be re-written as $$z(t) = z(o) + \frac{1}{t_1} \int_0^t \frac{f^2(\tau)}{2z(\tau)} dt$$

Although $y(o)$ is not in general equal to zero but in fact equals $f(o)$, $z(o)$ is equal to zero.
Thus $$z(t) = \int_0^t \frac{f^2(\tau)}{2t_1 z(\tau)} d\tau$$

and $$z(t_1) = \int_0^{t_1} \frac{f^2(\tau)}{2t_1 z(\tau)} d\tau = y(t_1) \quad \text{(Equation 5)}$$

With the above-mentioned modified operation the interval $o$ to $t_1$, the meter derives $y(t_1)$ according to Equation 5.

Since no function generator can be designed to multiply by a vanishingly small fraction $1/2t$ after a long time $t$, the function generator is designed to multiply by a fixed fraction $1/2t_2$, after time $t_2$. The output of the meter is, after time $t_2$, that of a conventional meter having a time constant $2t_2$.

After time $t_2$ the meter output is given by:

$$y(t) = y(t_2) + \int_{t_2}^t \left( \frac{f^2(\tau)}{2t_2 y(\tau)} - \frac{y(\tau)}{2t_2} \right) d\tau$$

Differentiating and re-arranging gives:

$$[1 + t_2 D] y^2(\tau) = f^2(\tau)$$

where $D = d/d\tau$

Thus the meter operates to square the instantaneous input and divide by a time constant (in this case $1 + t_2 D$) as does a conventional meter, to form $y^2(t)$, and then takes the square root to give $y(t)$. This part of the operation usually being allowed for in a conventional instrument by the design of the scale.

For use over a wide range of low frequencies a switch may be provided which allows a choice of values of $t_1$ and $t_2$. For convenience the function generator is arranged to work without change of the constants representing $t_1$ and $t_2$ but the ratio of instrument time to real time is varied, i.e. $t_1$ and $t_2$ are always represented by the same states of the clock pulse counter. Circuits which may be used for the subtractor 14, the function generator 15 and the integrator 16 will now be described in more detail.

Referring to FIG. 2 the output from the squarer-divider 13 is applied through resistors $R_1$ and $R_2$ in series to the input of an integrating amplifier 20, having an integrating capacitor C. A resistor $R_3$ is connected between the junction of $R_1$ with $R_2$ (the point A) and the wiper of changeover contacts RLK/1 of a relay RLK (not shown). The normally-closed contact of RLK/1 is connected to ground and the normally-open contact to the output of the integrating amplifier 20. Also connected to the point A is an array of ten binary weighted resistors R4 to R13. The resistors $R_1$, $R_2$ and $R_3$ are made equal each resistor having a value 3R of 3 MΩ, R being equal to 1 megohm. The binary weighted resistors R4 to R$_4$ have the values R, R/2, R/4 . . . R/512 respectively. A clock pulse generator 21 is connected to a 10-stage binary counter 22, the output from each stage of which is arranged to energise the coil of one of relays RLA–RLJ. The clock-pulse generator can comprise an emitter-coupled multivibrator having a period of 1, 10 or 100 secs. The relays RLA–RLJ are preferably reed relays each relay having a pair of normally-open contacts, and the contacts being designated RLA/1 to RLJ/1 respectively. The resistors R4 to R13 are connected, as shown in series with the contacts RLA/1 to RLJ/1 respectively. As the count in the binary counter increases the associated relays are energised in such a manner as to cause the conductance between point A and a point of reference potential such as ground to increase in a linear manner. At the start of a measurement with the counter 22 reset to zero, the relay contacts as shown and the resistor $R_3$ connected to earth through the normally-closed contacts of the relay RLK, the clock pulse generator 21 is activated. After one period of the generator (i.e. at time $t_1$) the wiper RLK/1 changes-over to connect the resistor $R_3$ to the output of the integrating amplifier 20. A first pulse is fed into the counter 22 thus energising the relay RLA and connecting the resistor R4 to the point A. As further pulses are fed into the counter the successive operation of the relays RLA–RLJ causes the shunt conductance at the point A to increase linearly. This reduces linearly the current fed into the integrator from the squarer-divider 13 and thus performs the function of division by a factor which increases linearly with time. At the end of 1023 clock pulses each stage of the counter is held so energising all of the relays RLA–RLJ. This is equivalent to multiplying by $1/t_2$ where $t_2 = 1023$. The counter will then remain in this state until a new measurement is required.

Since in fact it is required to multiply by $1/2t_1$, $1/2t$ and $1/2t_2$ at the appropriate times the voltage from the squarer divider circuit and the amplifier output voltage are halved by means of potentiometers (not shown) before application to the amplifier input.

The function of subtraction as carried out by the circuit of FIG. 2 can best be understood from a consideration of the current equivalent circuits (FIGS. 3a and 3b) of that circuit connected to the input of the amplifier 20. In FIG. 3a $V_1$ is the input voltage applied to the resistor $R_1$, $y$ the output voltage from the integrating amplifier 20 and $i$ the current fed into the integrating amplifier. FIG. 3a is the complete equivalent circuit comprising two current generators, one due to the input voltage (current $= V_1/R_1$) and the other due to the feedback voltage (current $= -y/R_3$). Clearly the current $i$ is proportional to the differences of the voltages i.e. $(V_1-y)$. Since $R_1=R_2=R_3=3R$ and the resistors $R_1$, $R_2$ and $R_3$ are connected in parallel, the equivalent circuit of FIG. 3a can be reduced to that of FIG. 3b. It can be seen therefore that subtraction and division by a linearly increasing factor is carried out as required, and the the resultant signal is applied to the integrating amplifier 20. The output of this amplifier may be connected to a moving coil meter to act as the indicator 17. The integrator 16, instead of being the conventional capacity-feedback amplifier already mentioned, may be a circuit of known type which first converts the voltage applied to the integrator to a train of pulses the mean frequency of which is proportional to the voltage. The pulse train is applied to one set of poles of a step motor (a commercially available motor having two sets of stator poles) and each pulse is delayed and also applied to the other set of poles. The step motor then rotates at a speed proportional to the applied voltage and therefore the total angular rotation of the motor is proportional to the time integral of the input voltage. The indicator 17 may then consist of a gear train or Geneva-motion train, fitted with dials, driven by the step motor. Such an arrangement gives a mechanical integrated signal but an electrical signal is also required for the feed-back path 12. This can be provided by a potentiometer connected to a reference voltage the wiper being driven by the step motor through a gear train, and providing the electrical integrated signal. As a modification of the arrangement shown in the drawings the integrator 16 may be constructed to have two equal outputs of opposite sign, and the subtractor circuit 14 may be replaced by two additive inputs to the function generator. That is the output from the squarer divider is added to a negative output of the meter at the input to the function generator. The mean value meter, the second embodiment of the invention, is similar to the R.M.S. meter, but with the squarer divider omitted and the scale factor of the function generator changed to multiply (in effect) by $1/t$ instead of $1/2t$. In this way a signal is formed in accordance with Equation 3. The function generator of the mean value meter may be modified, in a similar way to the R.M.S. meter, to operate before time $t_1$ and after time $t_2$ by multiplying by $1/t_1$ and $1/t_2$ respectively. The meters described may be used to measure an input consisting of any number of sinusoidal components or a stationary random process. Their output will first vary and later take up a steady value indicating that the measurement is valid.

What is claimed is:

1. A method of developing an electrical output signal representative of the R.M.S. value of an electrical input signal comprising the steps of squaring the input electrical signal to form a squared electrical signal, dividing the squared signal by the output signal to form a first quotient signal, subtracting said output signal from said first quotient signal to form an electrical difference signal, dividing the magnitude of said difference signal by a factor linearly-increasing with respect to time to form a second electrical quotient signal, and integrating said second quotient signal with respect to time to yield said output signal.

2. An apparatus for measuring the R.M.S. value of an electrical signal, said apparatus yielding an output signal, comprising the combination of means for squaring the instantaneous electrical input signal to the apparatus, means for deriving an electrical quotient signal by dividing the squared input signal by said output signal, means for subtracting said output signal from said quotient signal to form a difference signal, function generator means for dividing said difference signal by a factor which increases linearly with respect to time, and integrator means for integrating the signal from said function generator means with respect to time to yield said output signal.

3. A meter according to claim 2 further comprising switching means for connecting the instantaneous input direct to said means for subtracting and for changing the division factor of said division means whereby said R.M.S. meter can be converted, by operating said switching means, to a mean value measuring meter.

4. A meter according to claim 2 wherein said function-generator means includes time-dependent means comprising a plurality of binary switching circuits connected as a counter, and means controlled by said counter to provide said linearly increasing factor.

5. A meter according to claim 2 wherein the integrator means comprises, a capacity-feedback amplifier.

6. A method of measuring the mean value of an electrical signal, said method yielding an output signal, comprising the steps of providing an electrical signal to be measured, forming an electrical difference signal from said signal to be measured and said output signal, dividing said difference signal by a factor linearly-increasing with respect to time to form an electrical quotient signal, and integrating said quotient signal with respect to time to yield said output signal.

7. A meter for measuring the mean value of an electrical signal, said meter yielding an electrical output signal, comprising difference means for forming an electrical difference signal from the instantaneous input signal and said output signal, function-generator means for dividing the magnitude of said difference signal by a factor which increases linearly with respect to time, and integrator means for integrating with respect to time, the signal from said function-generator means, to yield said output signal.

8. A meter according to claim 7 wherein said function-generator means operates to divide by a constant for a predetermined time from the start of measurement before dividing by said linearly-increasing signal.

9. A meter according to claim 7 wherein said function-generator means, after dividing by said first linearly-increasing signal, starts to divide by a further constant, at another predetermined time from the start of measurement, said division continuing until measurement ceases.

10. A meter according to claim 7 wherein the function-generator means includes,
   a number of binary-weighted toggle circuits connected as counter, and
   means controlled by said counter to provide said linearly increasing factor.

11. A meter according to claim 7 wherein the integrator means comprises, a capacity-feedback amplifier.

References Cited

UNITED STATES PATENTS

| 2,842,740 | 7/1958 | Sparks | 324—120 |
| 3,159,787 | 12/1964 | Sexton et al. | 324—132 X |
| 3,205,347 | 9/1965 | Wright | 235—193.5 |

MALCOLM A. MORRISON, Primary Examiner

FELIX D. GRUBER, Assistant Examiner

U.S. Cl. X.R.

235—151.31, 193.5, 195, 197; 324—76, 126